(12) United States Patent
Piotrowski

(10) Patent No.: US 12,108,890 B1
(45) Date of Patent: Oct. 8, 2024

(54) LAYERED CAKE STABILIZING SYSTEM

(71) Applicant: Brenda Piotrowski, Brookhaven, GA (US)

(72) Inventor: Brenda Piotrowski, Brookhaven, GA (US)

(*) Notice: Subject to any disclaimer, the term of this patent is extended or adjusted under 35 U.S.C. 154(b) by 259 days.

(21) Appl. No.: 17/948,319

(22) Filed: Sep. 20, 2022

(51) Int. Cl.
| | |
|---|---|
| A47G 19/00 | (2006.01) |
| A21C 15/00 | (2006.01) |
| A47J 27/13 | (2006.01) |
| B65D 5/20 | (2006.01) |
| B65D 5/30 | (2006.01) |
| B65D 5/468 | (2006.01) |
| B65D 5/498 | (2006.01) |
| B65D 85/36 | (2006.01) |

(52) U.S. Cl.
CPC .............. *A47G 19/00* (2013.01); *A21C 15/00* (2013.01); *A47J 27/13* (2013.01); *B65D 5/2057* (2013.01); *B65D 5/302* (2013.01); *B65D 5/4608* (2013.01); *B65D 5/48048* (2013.01); *B65D 85/36* (2013.01); *B65D 2585/363* (2013.01)

(58) Field of Classification Search
CPC ....... A21C 15/00; A47G 19/00; B65D 5/2057
See application file for complete search history.

(56) References Cited

U.S. PATENT DOCUMENTS

| | | |
|---|---|---|
| 1,944,305 A | 1/1934 | Schmidt |
| 2,661,679 A | 12/1953 | Guilder |
| D245,139 S | 7/1977 | Graham |
| 6,374,755 B1 | 4/2002 | Haase |
| D490,268 S | 5/2004 | Groll |
| 8,516,967 B2 | 8/2013 | Jeffrey |
| 10,264,900 B2 | 4/2019 | Grive |
| 2011/0017108 A1 | 1/2011 | Harris |
| 2013/0136829 A1 | 5/2013 | Kandel |

FOREIGN PATENT DOCUMENTS

WO 2018083477 5/2018

*Primary Examiner* — James Sanders
(74) *Attorney, Agent, or Firm* — Kyle A. Fletcher, Esq.

(57) ABSTRACT

The layered cake stabilizing system comprises a stabilizer and one or more cake pans. The one or more cake pans may be configured to bake multiple layers of a cake. The one or more cake pans may be operable to create a central aperture in each layer of the cake. The stabilizer may comprise a stabilizer rod rising vertically from the top center of the stabilizer. The multiple layers of the cake may be placed on the stabilizer such that the multiple layers stack to form the cake and the stabilizer rod passes through the central apertures of individual layers. The stabilizer rod may prevent horizontal movement of the individual layers. The layered cake stabilizing system may further comprise an outer box for protecting the cake and a cake lifter for placing the stabilizer and the cake into the outer box.

18 Claims, 8 Drawing Sheets

LAYERED CAKE STABILIZING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of cake transportation devices, more specifically, a layered cake stabilizing system.

SUMMARY OF INVENTION

The layered cake stabilizing system comprises a stabilizer and one or more cake pans. The one or more cake pans may be configured to bake multiple layers of a cake. The one or more cake pans may be operable to create a central aperture in each layer of the cake. The stabilizer may comprise a stabilizer rod rising vertically from the top center of the stabilizer. The multiple layers of the cake may be placed on the stabilizer such that the multiple layers stack to form the cake and the stabilizer rod passes through the central apertures of individual layers. The stabilizer rod may prevent horizontal movement of the individual layers. The layered cake stabilizing system may further comprise an outer box for protecting the cake and a cake lifter for placing the stabilizer and the cake into the outer box.

An object of the invention is to provide one or more cake pans for baking layers of the cake where each individual layer of the cake comprises a central aperture.

Another object of the invention is to provide a stabilizer such that the individual layers of the cake may be stacked on the stabilizer with a stabilizer rod extending vertically through the central apertures of the individual layers of the cake.

A further object of the invention is to provide a cake lifter for lifting the stabilizer and cake.

Yet another object of the invention is to provide an outer box into which the lifter, stabilizer, and cake may be placed such that the outer box protects the cake during transport.

These together with additional objects, features and advantages of the layered cake stabilizing system will be readily apparent to those of ordinary skill in the art upon reading the following detailed description of the presently preferred, but nonetheless illustrative, embodiments when taken in conjunction with the accompanying drawings.

In this respect, before explaining the current embodiments of the layered cake stabilizing system in detail, it is to be understood that the layered cake stabilizing system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the layered cake stabilizing system.

It is therefore important that the claims be regarded as including such equivalent construction insofar as they do not depart from the spirit and scope of the layered cake stabilizing system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
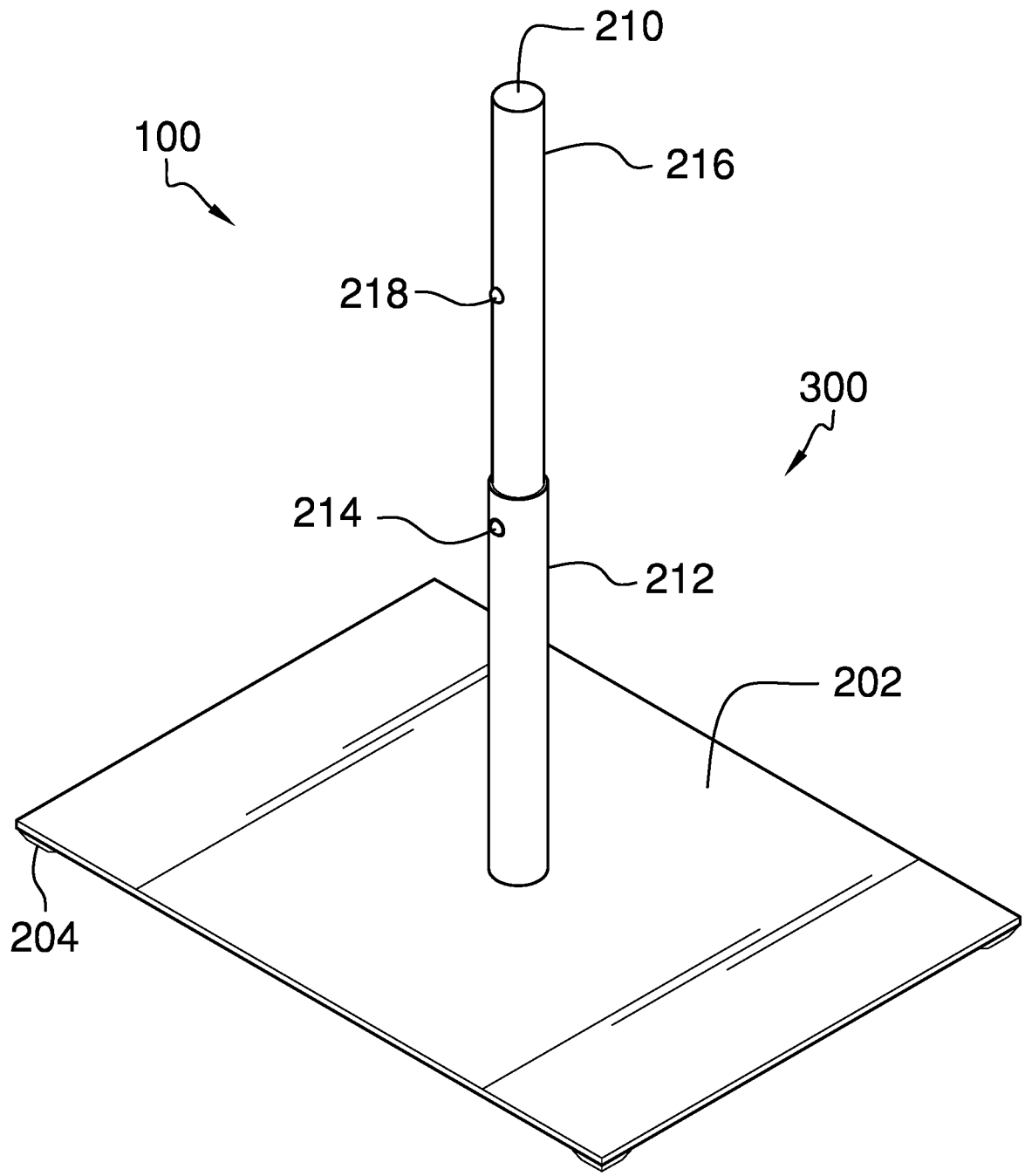
FIG. 1 is an isometric view of a first embodiment of the disclosure, illustrating the stabilizer.
Figure 2:
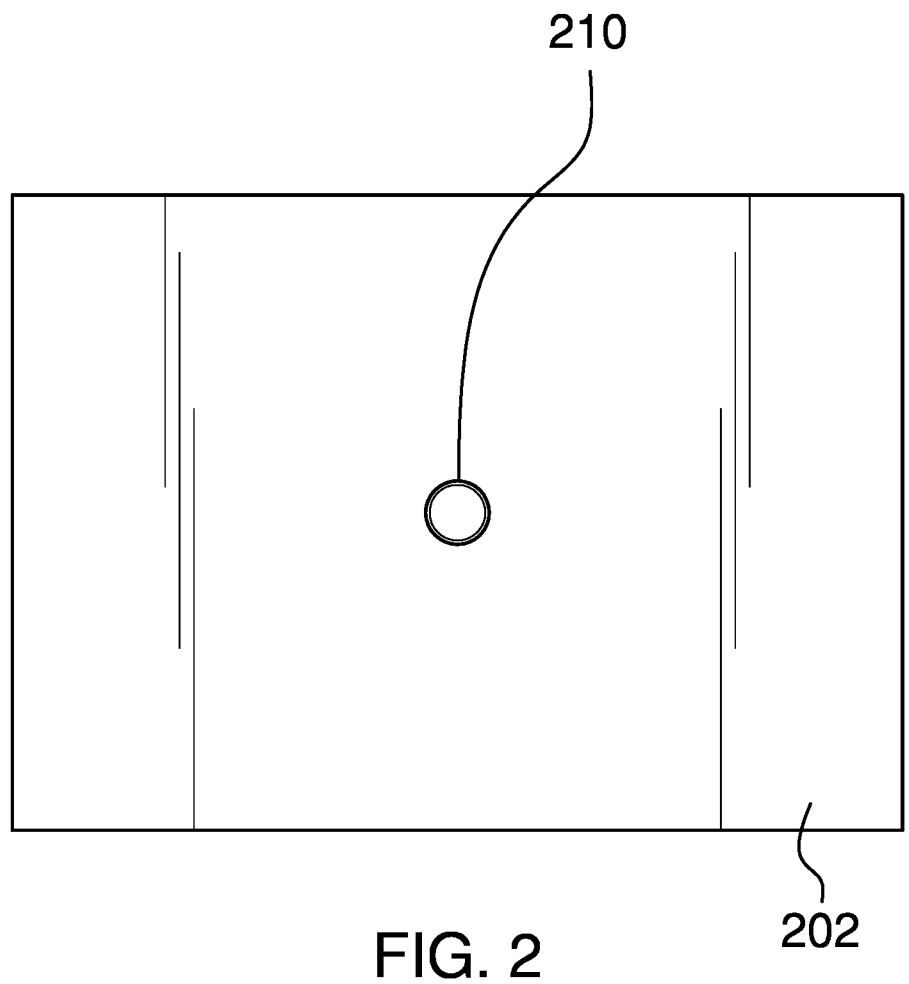
FIG. 2 is a top view of a first embodiment of the disclosure, illustrating the stabilizer.
Figure 3:
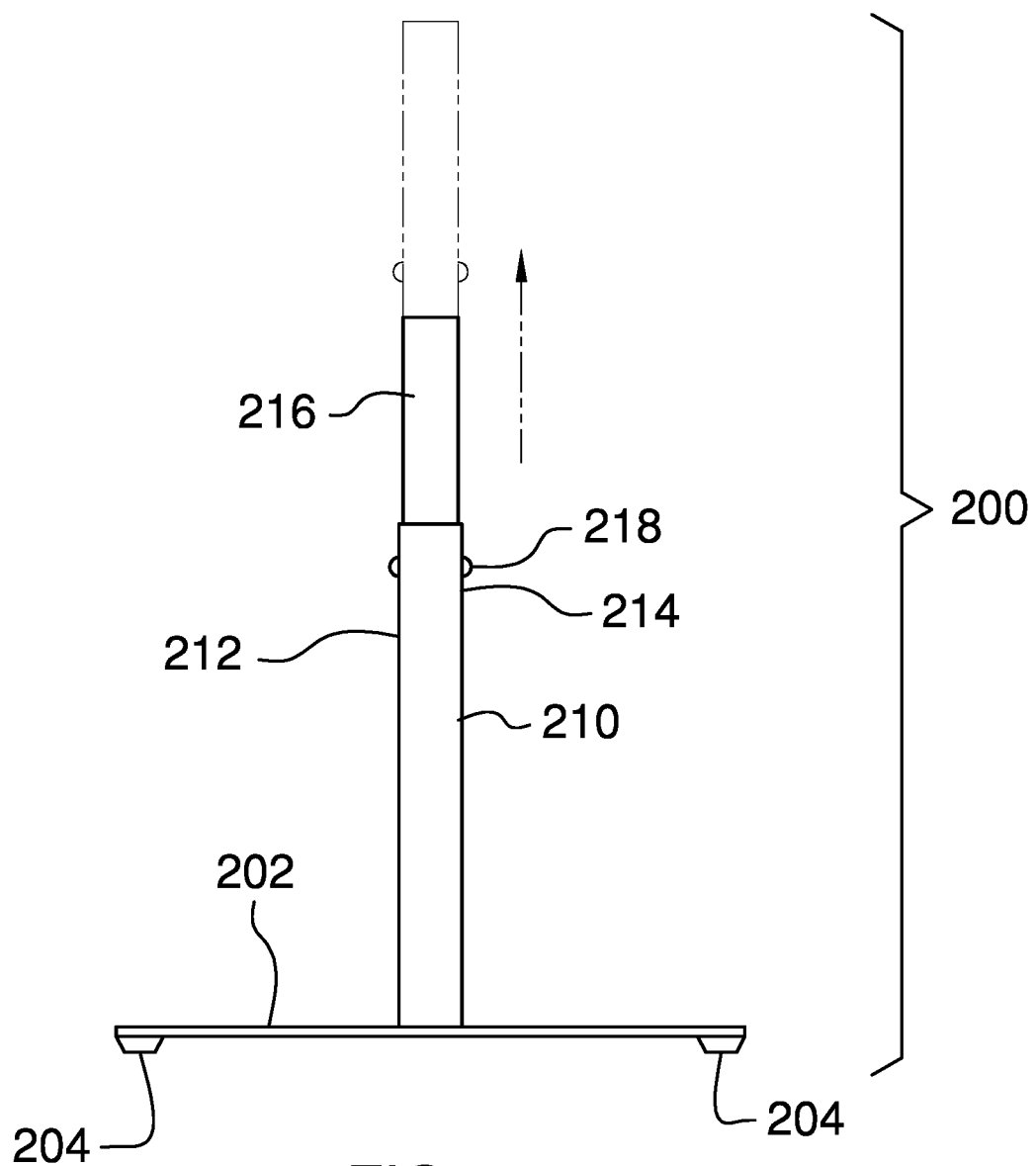
FIG. 3 is a side view of a first embodiment of the disclosure, illustrating the stabilizer.
Figure 4:
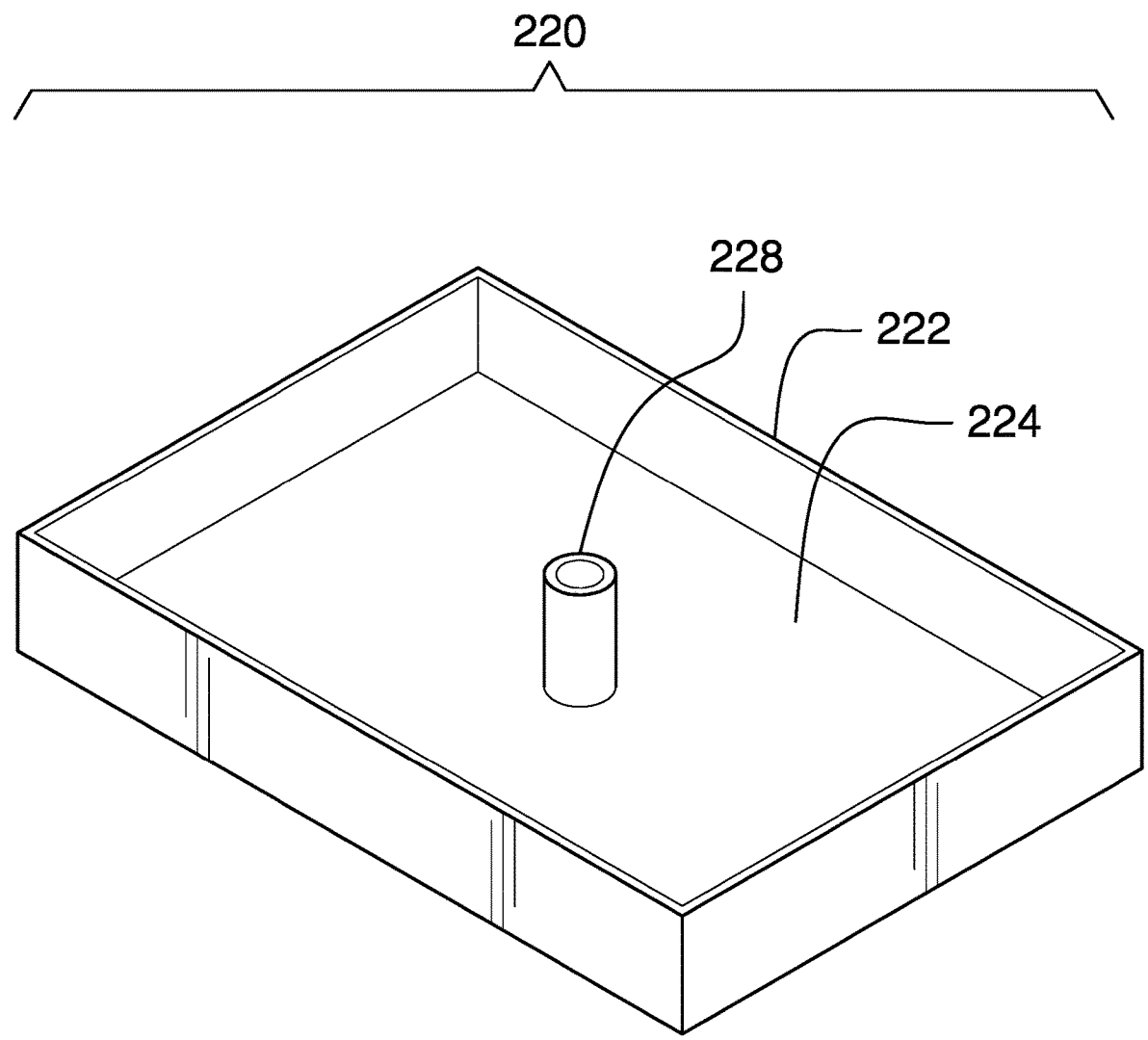
FIG. 4 is an isometric view of a first embodiment of the disclosure, illustrating an individual cake pan.
Figure 5:
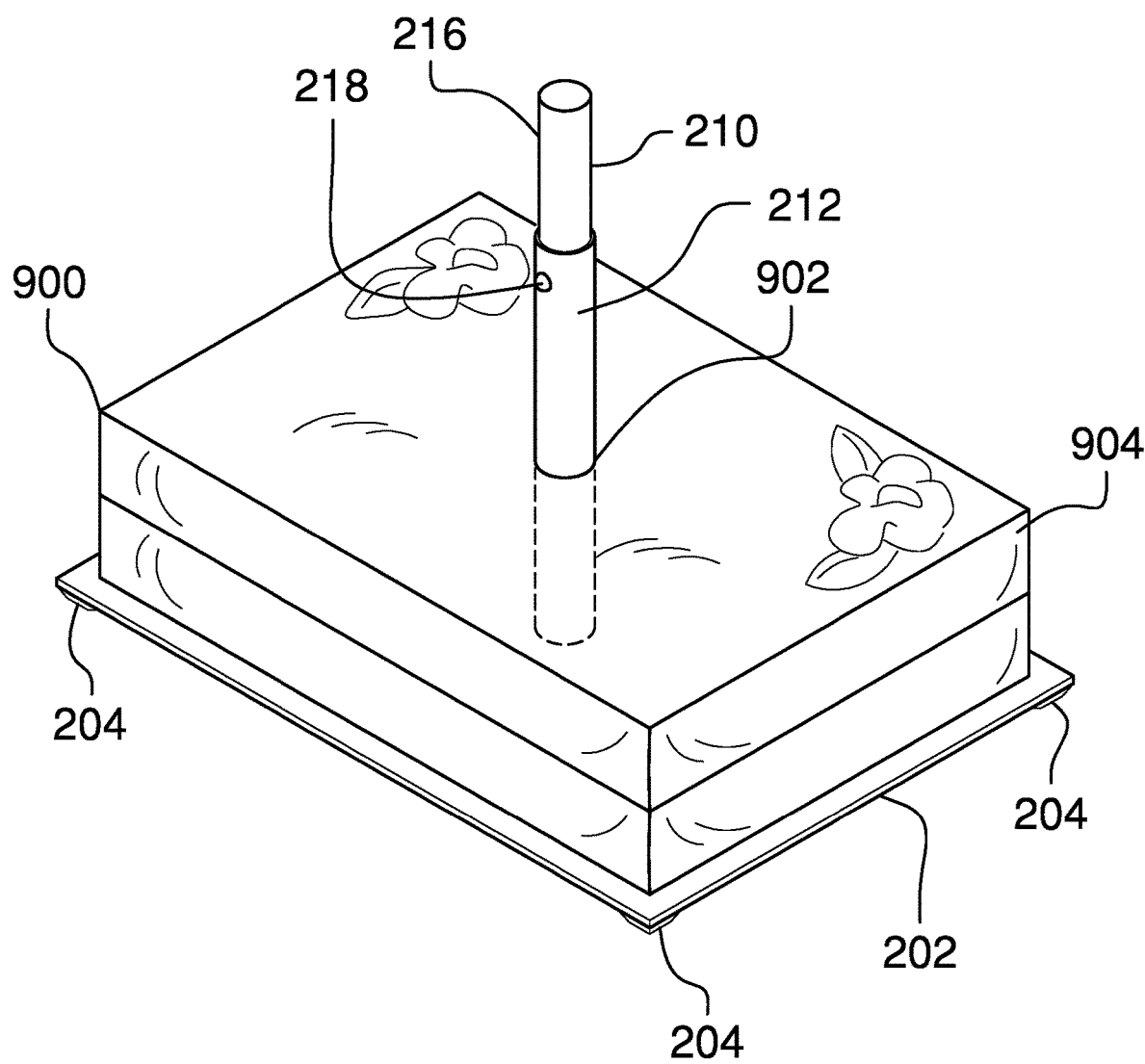
FIG. 5 is an in-use view of a first embodiment of the disclosure.
Figure 6:
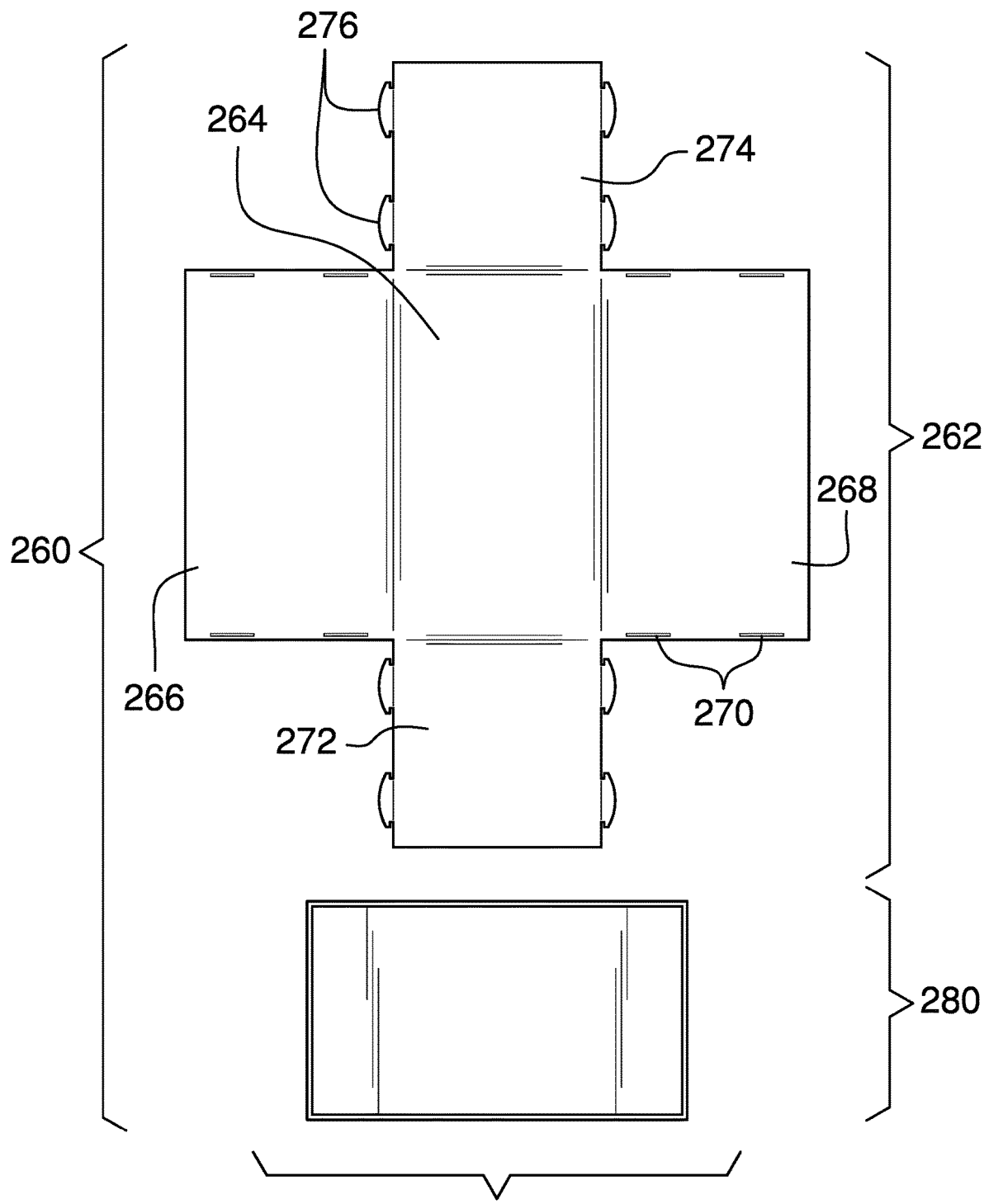
FIG. 6 is a detail view of a first embodiment of the disclosure, illustrating the outer box.
Figure 7:
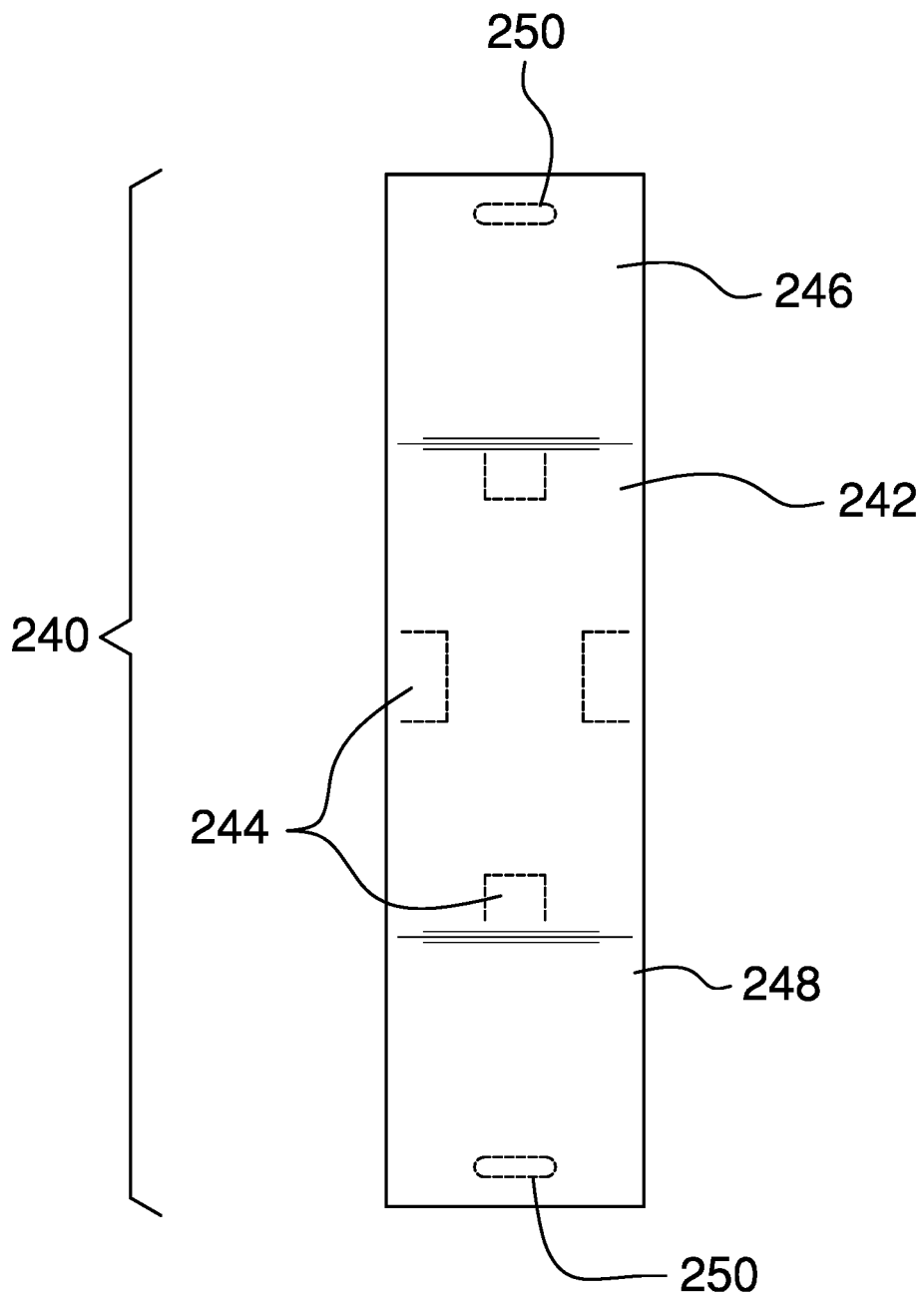
FIG. 7 is a detail view of a first embodiment of the disclosure, illustrating the cake lifter.
Figure 8:
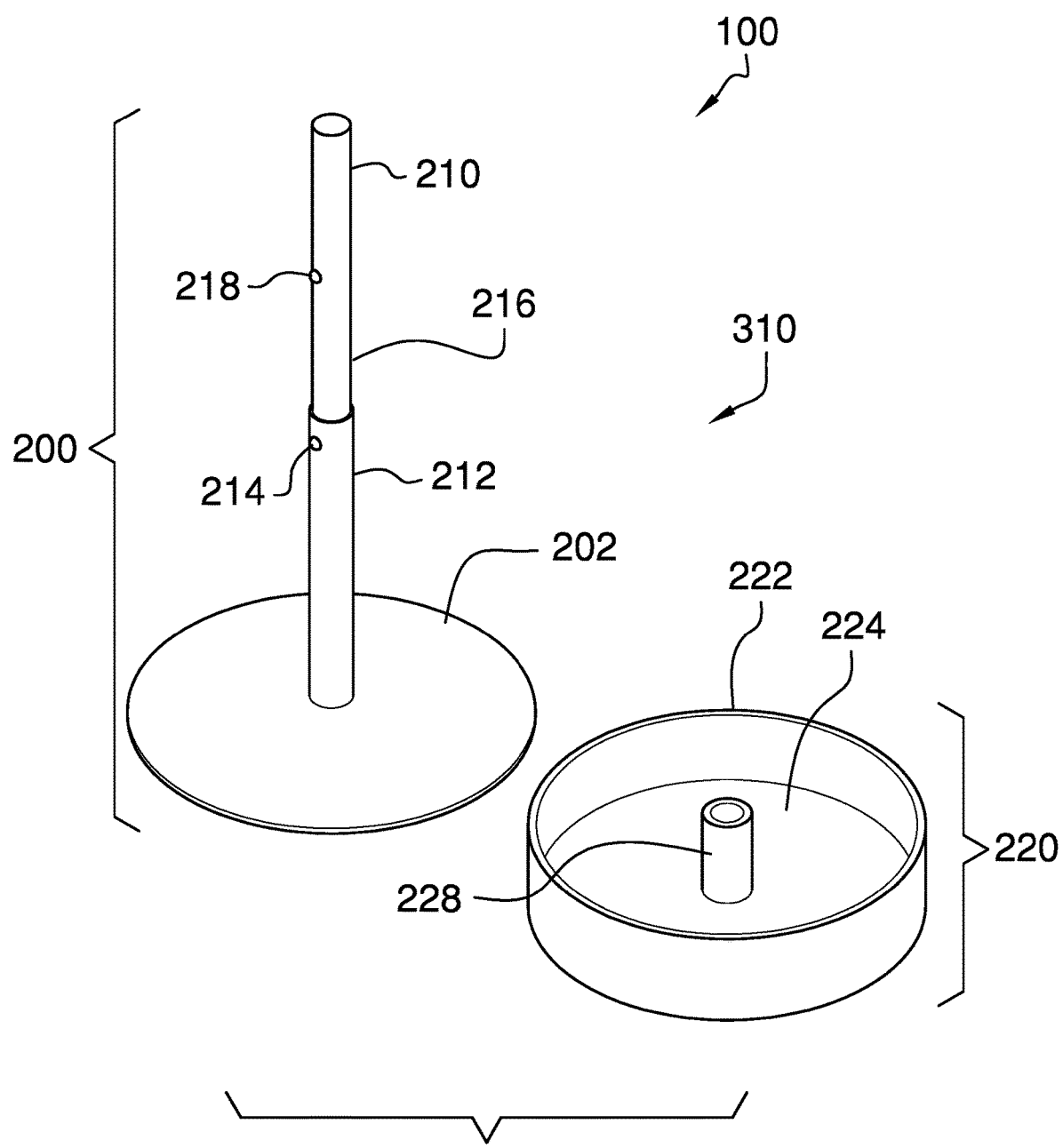
FIG. 8 is an isometric view of a second embodiment of the disclosure.

Detailed reference will now be made to a first potential embodiment of the disclosure, which is illustrated in FIGS. 1 through 8.

The layered cake stabilizing system 100 (hereinafter invention) comprises a stabilizer 200 and one or more cake pans. The one or more cake pans may be configured to bake multiple layers of a cake 900. The one or more cake pans may be operable to create a central aperture 902 in each layer of the cake 900. The stabilizer 200 may comprise a stabilizer rod 210 rising 19 vertically from the top center of the stabilizer 200. The multiple layers of the cake 900 may be placed on the stabilizer 200 such that the multiple layers stack to form the cake 900 and the stabilizer rod 210 passes through the central apertures 902 of individual layers 904. The stabilizer rod 210 may prevent horizontal movement of the individual layers 904.

The stabilizer 200 may comprise a stabilizer base 202 and the stabilizer rod 210. The stabilizer base 202 may be a horizontally-oriented plate. The stabilizer base 202 may have a larger footprint than the cake 900 such that the cake 900 does not overhang the stabilizer base 202. In some embodiments, the stabilizer base 202 may be the same shape as the cake 900. The bottom of the stabilizer base 202 may comprise a plurality of feet 204 such that the stabilizer base 202 is elevated above the surface that the stabilizer base 202 stably rests upon.

The stabilizer rod 210 may project vertically upwards from the top center of the stabilizer base 202. The stabilizer rod 210 may provide a central pillar passing through the individual layers 904 of the cake 900 to prevent the individual layers 904 from moving in any horizontal direction.

The height of the stabilizer rod 210 may be telescopically adjustable such that the stabilizer rod 210 may be lengthened for taller cakes and shortened for lower cakes. As a non-limiting example, the stabilizer rod 210 may comprise a lower rod 212 and an upper rod 216. The lower rod 212 may be hollow and the inside diameter of the lower rod 212 may be larger than the outside diameter of the upper rod 216 such that the upper rod 216 may slide up and down within the lower rod 212.

The lower rod 212 may comprise a plurality of telescopic apertures 214 and the upper rod 216 may comprise one or more telescopic buttons 218 which are spring-loaded. The stabilizer rod 210 may be retained at a predefined height when at least one of the one or more telescopic buttons 218 align with any of the plurality of telescopic apertures 214, permitting at least one of the one or more telescopic buttons 218 to engage at least one of the plurality of telescopic apertures 214. The stabilizer rod 210 may be adapted to change height when a user presses the one or more telescopic buttons 218 to disengage the one or more telescopic buttons 218 from all of the plurality of telescopic apertures 214 and simultaneously raises or lowers the upper rod 216.

The one or more cake pans may be metal pans. An individual cake pan 220 selected from the one or more cake pans may be baked in an oven after cake batter is placed into the individual cake pan 220. The individual cake pan 220 may be inverted once the individual cake pan 220 has cooled to release the individual layer 904 of the cake 900.

The individual cake pan 220 may comprise a plurality of cake pan side panels 222, a cake pan bottom panel 224, and a center baffle 228. The plurality of cake pan side panels 222 may be vertically oriented and may define the boundaries of the individual layer 904. The plurality of cake pan side panels 222 may be coupled to the cake pan bottom panel 224 to form a container for holding the cake batter. The center baffle 228 may be a vertically oriented cylinder located at the center of the individual cake pan 220. The center baffle 228 may be the same height as the plurality of cake pan side panels 222. The center baffle 228 may prevent the cake batter from filling the center of the individual layer 904, thus forming the central aperture 902 in the individual layer 904. The central aperture 902 may be configured for the stabilizer rod 210 to pass through the individual layer 904 when the individual layer 904 is placed onto the stabilizer 200.

The invention 100 may further comprise a transport box. The transport box may be configured to transport the stabilizer 200 and the cake 900 such that the cake 900 is protected from damage during transport. The transport box may comprise a cake lifter 240 and an outer box 260. The cake lifter 240 may be operable to lift the stabilizer 200 and the cake 900 such that the stabilizer 200 and the cake 900 may be placed into the outer box 260. The outer box 260 may protect the cake 900 from damage and contamination.

The cake lifter 240 may comprise a lifter center panel 242, a first handle flap 246, and a second handle flap 248. The lifter center panel 242 may be a horizontally oriented panel that the stabilizer 200 may be place upon. The lifter center panel 242 may comprise pop-up stops 244 that may fold upwards to limit horizontal motion of the stabilizer 200 on the lifter center panel 242. The first handle flap 246 and the second handle flap 248 may be coupled to opposite sides of the lifter center panel 242. The first handle flap 246 and the second handle flap 248 may comprise handle apertures 250 located on the distal one quarter of the first handle flap 246 and the second handle flap 248. The first handle flap 246 and the second handle flap 248 may be folded upwards such that the cake lifter 240 may be raised and lowered using the handle apertures 250.

The outer box 260 may comprise a box bottom 262 and a lid 280. The outer box 260 may be a protective cover for transporting the cake 900. The cake 900 may be lowered into the box bottom 262 while the cake 900 is on the stabilizer 200 and the stabilizer 200 is lifted by the cake lifter 240. The lid 280 may be placed on top of the box bottom 262 to enclose the cake 900.

The box bottom 262 may comprise an outer box center panel 264, an outer box left flap 266, an outer box right flap 268, an outer box front flap 272, and an outer box rear flap 274. The outer box center panel 264 may be a horizontally oriented panel that may form the bottom of the outer box 260. The outer box left flap 266 and the outer box right flap 268 may fold upwards to form a left side and a right side of the outer box 260. The outer box front flap 272 and the outer box rear flap 274 may fold upwards to form a front side and a rear side of the outer box 260. The outer box left flap 266 and the outer box right flap 268 may couple to the outer box front flap 272 and the 14 outer box rear flap 274 to define an open-top box. As a non-limiting example, the outer box left flap 266 and the outer box right flap 268 may comprise a plurality of slots 270. The outer box front flap 272 and the outer box rear flap 274 may comprise a plurality of tabs 276. The plurality of tabs 276 may engage 19 the plurality of slots 270 to hold the shape of the box bottom 262.

In a preferred embodiment, the stabilizer 200 may be made from durable plastic or metal. The cake lifter 240 and the outer box 260 may be made from cardboard or plastic such that the cake lifter 240 and the outer box 260 do not retain heat that might cause damage to the cake 900, such as by melting icing.

In a first embodiment 300, the stabilizer base 202 and the one or more cake pans may be rectangular such that the invention 100 may be configured to make and transport a rectangular cake. The lifter center panel 242 and the outer box center panel 264 may be rectangular such that the stabilizer base 202 may be placed on the lifter center panel 242 and, in turn, into the outer box 260.

In a second embodiment 310, the stabilizer base 202 and the one or more cake pans may be round such that the invention 100 may be configured to make and transport a round cake. The lifter center panel 242 and the outer box center panel 264 may be square such that the stabilizer base 202 may be placed on the lifter center panel 242 and, in turn, into the box bottom 262.

In use, the user may bake the cake batter in the one or more cake pans to form the multiple layers of the cake 900. The multiple layers may be separated from the one or more cake pans and the individual layers 904 may be stacked on the stabilizer base 202 such that the stabilizer rod 210 extends upwards from the stabilizer base 202 through the central apertures 902 of the individual layers 904 of the cake 900. The cake 900 may be decorated. As non-limiting examples, icing may be spread over the cake 900, decorative trim may be added, greetings may be written on the cake 900, or any combination thereof. In some embodiments, the stabilizer rod 210 may extend up into the topmost layer of the cake 900 but may be lower than the top surface of the cake 900 such that the stabilizer rod 210 may retain all of the individual layers 904 in place but may not be seen extending above the cake 900. It may be possible to ice over the central aperture 902 of the topmost layer such that the cake 900 appears to just rest on the stabilizer base 202 with no visible stabilization.

The outer box 260 may be formed by folding up the outer box left flap 266, the outer box right flap 268, the outer box front flap 272, and the outer box rear flap 274 and by interlocking the plurality of tabs 276 into the plurality of slots 270.

The stabilizer 200 may be placed onto the lifter center panel 242. The first handle flap 246 and the second handle flap 248 may be folded upwards and may be used to lift the stabilizer 200 and the cake 900. The cake lifter 240 may be lowered into the outer box 260 and the lid 280 may be placed on top of the outer box 260. The cake 900, now inside of the outer box 260, may be ready for transport.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used in this disclosure, to "bake" may refer to cooking through the exposure of food to a source of continuous dry heat.

As used herein, the words "couple", "couples", "coupled" or "coupling", may refer to connecting, either directly or indirectly, and does not necessarily imply a mechanical 8 connection.

As used in this disclosure, "decorative" may be an adjective that refers to a first object or item that is used with a second object or item of the purpose of making the second object or item more attractive and/or more distinct. Decorative will generally, but not necessarily, imply making the second object or item more attractive visually.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, the terms "distal" and "proximal" may be used to describe relative positions. Distal refers to the object, or the end of an object, that is situated away from the point of origin, point of reference, or point of attachment. Proximal refers to an object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point, a central axis, or a centerline of an object and the direction of comparison may be in a radial or lateral direction.

As used herein, the word "durable" may refer to a material's ability to withstand wear, pressure, impact, heat, cold, sun exposure, and other forms of potentially damaging conditions without suffering any significant deterioration of quality or value.

As used here, "footprint" may refer to a projection of an object onto the surface that supports the object. The projection is usually, but not always, vertically downward.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "horizontal" may be a directional term that refers to a direction that is perpendicular to the local force of gravity. Unless specifically noted in this disclosure, the horizontal direction is always perpendicular to the vertical direction.

As used herein, "inside diameter" or "inner diameter" may refer to a measurement made on a hollow object. Specifically, the inside diameter is the distance from one inside wall to the opposite inside wall.

As used herein, the words "invert", "inverted", or "inversion" may refer to an object that has been turned inside out or upside down or to the act of turning an object inside out or upside down.

As used herein, "outside diameter" or "outer diameter" may refer to a measurement made on an object. Specifically, the outside diameter is the distance from one point on the outside of the object to a point on the opposite side of the object along a line passing through the center of the object.

As used herein, "rectangle" and "rectangular" may refer to a closed figure comprising four straight lines joined by four right angles. The opposing sides of a rectangle have equal length. A square is considered to be a special type of rectangle where all four sides are the same length. An object may still be considered to have a generally rectangular shape even if corners of the object are rounded off as long as two sets of opposing, straight-line, perpendicular sides are apparent.

As used in this disclosure, "telescopic", "telescoping", and "telescopically" may refer to an object made of two or more sections that fit or slide into each other such that the object can be made longer or shorter by adjusting the relative positions of the sections.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 8, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A layered cake stabilizing system comprising:
   a stabilizer and one or more cake pans;
   wherein the one or more cake pans are configured to bake multiple layers of a cake;
   wherein the one or more cake pans are operable to create a central aperture in each layer of the cake;
   wherein the stabilizer comprises a stabilizer rod rising vertically from the top center of the stabilizer;
   wherein the multiple layers of the cake are placed on the stabilizer such that the multiple layers stack to form the cake and the stabilizer rod passes through the central apertures of individual layers;
   wherein the stabilizer rod prevents horizontal movement of the individual layers;
   wherein the layered cake stabilizing system further comprises a transport box;
   wherein the transport box comprises a cake lifter and an outer box;
   wherein the cake lifter comprises a lifter center panel, a first handle flap, and a second handle flap;
   wherein the lifter center panel is a horizontally oriented panel that the stabilizer is placed upon;
   wherein the lifter center panel comprises pop-up stops that fold upwards to limit horizontal motion of the stabilizer on the lifter center panel;
   wherein the first handle flap and the second handle flap are coupled to opposite sides of the lifter center panel;
   wherein the first handle flap and the second handle flap comprise handle apertures located on the distal one quarter of the first handle flap and the second handle flap;
   wherein the first handle flap and the second handle flap are folded upwards such that the cake lifter is raised and lowered using the handle apertures.

2. The layered cake stabilizing system according to claim 1
   wherein the stabilizer comprises a stabilizer base and the stabilizer rod;
   wherein the stabilizer base is a horizontally-oriented plate;
   wherein the stabilizer base has a larger footprint than the cake such that the cake does not overhang the stabilizer base.

3. The layered cake stabilizing system according to claim 2
   wherein the stabilizer base is the same shape as the cake.

4. The layered cake stabilizing system according to claim 3
   wherein the bottom of the stabilizer base comprises a plurality of feet such that the stabilizer base is elevated above the surface that the stabilizer base rests upon.

5. The layered cake stabilizing system according to claim 3
   wherein the stabilizer rod projects vertically upwards from the top center of the stabilizer base;
   wherein the stabilizer rod provides a central pillar passing through the individual layers of the cake to prevent the individual layers from moving in any horizontal direction.

6. The layered cake stabilizing system according to claim 5
   wherein the height of the stabilizer rod is telescopically adjustable such that the stabilizer rod is lengthened for taller cakes and shortened for lower cakes.

7. The layered cake stabilizing system according to claim 6
   wherein the stabilizer rod comprises a lower rod and an upper rod;
   wherein the lower rod is hollow and the inside diameter of the lower rod is larger than the outside diameter of the upper rod such that the upper rod slides up and down within the lower rod.

8. The layered cake stabilizing system according to claim 7
   wherein the lower rod comprises a plurality of telescopic apertures and the upper rod comprises one or more telescopic buttons which are spring-loaded;
   wherein the stabilizer rod is retained at a predefined height when at least one of the one or more telescopic buttons align with any of the plurality of telescopic apertures, permitting at least one of the one or more telescopic buttons to engage at least one of the plurality of telescopic apertures;
   wherein the stabilizer rod is adapted to change height when a user presses the one or more telescopic buttons to disengage the one or more telescopic buttons from all of the plurality of telescopic apertures and simultaneously raises or lowers the upper rod.

9. The layered cake stabilizing system according to claim 8
   wherein the one or more cake pans are metal pans;
   wherein an individual cake pan selected from the one or more cake pans is baked in an oven after cake batter is placed into the individual cake pan;
   wherein the individual cake pan is inverted once the individual cake pan has cooled to release the individual layer of the cake.

10. The layered cake stabilizing system according to claim 9
    wherein the individual cake pan comprises a plurality of cake pan side panels, a cake pan bottom panel, and a center baffle;
    wherein the plurality of cake pan side panels are vertically oriented and define the boundaries of the individual layer;
    wherein the plurality of cake pan side panels are coupled to the cake pan bottom panel to form a container for holding the cake batter;
    wherein the center baffle is a vertically oriented cylinder located at the center of the individual cake pan;
    wherein the center baffle is the same height as the plurality of cake pan side panels;

wherein the center baffle prevents the cake batter from filling the center of the individual layer, thus forming the central aperture in the individual layer;

wherein the central aperture is configured for the stabilizer rod to pass through the individual layer when the individual layer is placed onto the stabilizer.

11. The layered cake stabilizing system according to claim 10 wherein the transport box is configured to transport the stabilizer and the cake such that the cake is protected from damage during transport;

wherein the cake lifter is operable to lift the stabilizer and the cake such that the stabilizer and the cake are placed into the outer box;

wherein the outer box protects the cake from damage and contamination.

12. The layered cake stabilizing system according to claim 11 wherein the outer box comprises a box bottom and a lid;

wherein the outer box is a protective cover for transporting the cake;

wherein the cake is lowered into the box bottom while the cake is on the stabilizer;

wherein the lid is placed on top of the box bottom to enclose the cake.

13. The layered cake stabilizing system according to claim 12 wherein the box bottom comprises an outer box center panel, an outer box left flap, an outer box right flap, an outer box front flap, and an outer box rear flap;

wherein the outer box center panel is a horizontally oriented panel that forms the bottom of the outer box;

wherein the outer box left flap and the outer box right flap fold upwards to form a left side and a right side of the outer box;

wherein the outer box front flap and the outer box rear flap fold upwards to form a front side and a rear side of the outer box.

14. The layered cake stabilizing system according to claim 13 wherein the outer box left flap and the outer box right flap couple to the outer box front flap and the outer box rear flap to define an open-top box.

15. The layered cake stabilizing system according to claim 14 wherein the outer box left flap and the outer box right flap comprise a plurality of slots;

wherein the outer box front flap and the outer box rear flap comprise a plurality of tabs;

wherein the plurality of tabs engage the plurality of slots to hold the shape of the box bottom.

16. The layered cake stabilizing system according to claim 15 wherein the stabilizer is made from plastic or metal;

wherein the cake lifter and the outer box are made from cardboard or plastic such that the cake lifter and the outer box do not retain heat.

17. The layered cake stabilizing system according to claim 16 wherein the stabilizer base and the one or more cake pans are rectangular such that the layered cake stabilizing system is configured to make and transport a rectangular cake.

18. The layered cake stabilizing system according to claim 16 wherein the stabilizer base and the one or more cake pans are round such that the layered cake stabilizing system is configured to make and transport a round cake.

* * * * *